Jan. 10, 1939.  C. J. McDONALD  2,143,080
ARTIFICIAL HORIZON ATTACHMENT FOR SEXTANTS
Filed Jan. 17, 1938
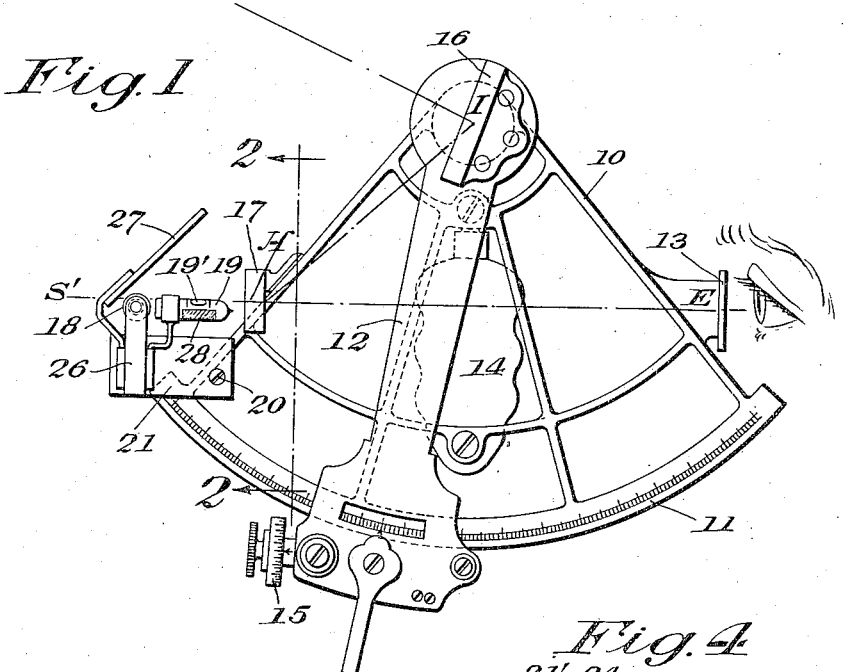
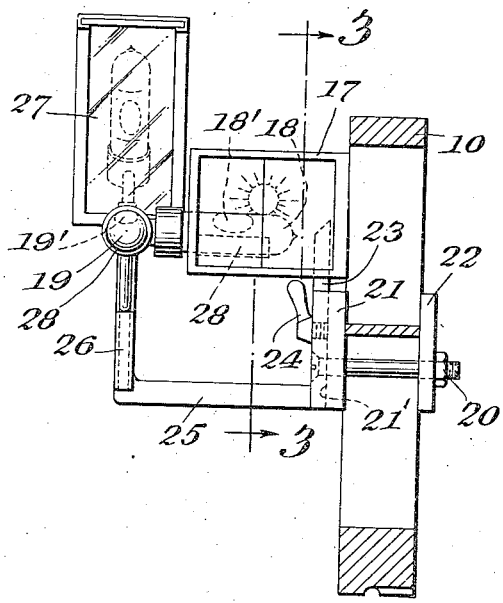
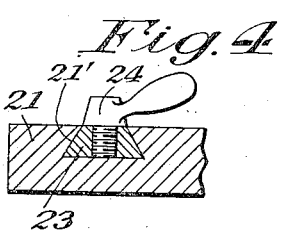
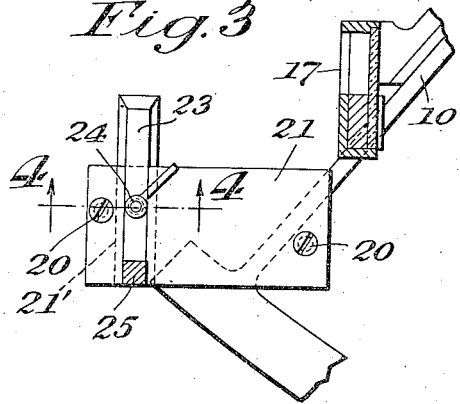
INVENTOR.
Courtney J. McDonald
BY Spear, Rawlings & Spear
ATTORNEYS.

Patented Jan. 10, 1939

2,143,080

UNITED STATES PATENT OFFICE 2,143,080

ARTIFICIAL HORIZON ATTACHMENT FOR SEXTANTS

Courtney J. McDonald, Gloucester, Mass.

Application January 17, 1938, Serial No. 185,333

5 Claims. (Cl. 88—2.2)

This invention relates to an artificial horizon attachment for sextants, quadrants, octants or like instruments for taking observations at sea, but is not limited to such use.

Its general object is to enable correct observations to be taken under conditions when the natural horizon may be concealed, as by reason of darkness, fog or like, and its construction is such that the navigator, in taking an observation, may be certain that it was taken on a plane with the sea horizon and its accuracy was not affected by the pitching or rolling of the vessel.

According to my invention the means for producing an artificial horizon comprises a horizontally disposed bubble tube adjustably mounted on the frame of the instrument in advance of the usual horizon glass and at right angles to the direct line of vision through the center of the horizon glass. When properly adjusted and locked in its adjusted position, the bubble of said tube exactly coincides with the direct line of vision through the center of the horizon glass, thus indicating the true horizon. If during the use of the instrument, the movement of the vessel causes the instrument to deviate laterally from the vertical, such deviations are indicated to the navigator by the movement of the bubble in the bubble tube. The navigator will not, of course, take a sight until the bubble comes to rest in correct relation to its markings on the tube.

In order to indicate to the navigator deviations of the instrument in a direction normal to the horizontal during the use of the instrument, I provide a second horizontally disposed bubble tube which is offset with respect to the direct line of vision through the center of the horizon glass so as not to obstruct the same. The longitudinal axis of this bubble tube angularly intersects that of the first-named bubble tube, preferably at right angles thereto, and the navigator observes the movement of the bubble in this second bubble tube and does not take a sight until it has come to rest in correct relation to its markings on the tube.

In order to enable the navigator to conveniently observe the movement of the bubble in said second bubble tube during the use of the instrument, I mount a mirror adjacent the second bubble tube at an angle, preferably 45°, such that the image of the bubble in the second bubble tube appears in the mirror as occupying a vertical position.

In order to enable the movement of the bubbles to be observed at night or under conditions of fog, means may be provided for dimly illuminating the same. Conveniently I may coat portions of the bubble tubes with luminous paint, or the bubbles themselves may, if desired, be of luminous composition, or I may arrange adjacent to the bubble tubes a dimly glowing light source.

In the accompanying drawing wherein I have illustrated my invention as an attachment for a sextant of conventional type, Fig. 1 is an elevation of such sextant equipped with my invention.

Fig. 2 is a section on the line 2—2, of Fig. 1.

Fig. 3 is a section on the line 3—3, of Fig. 2, and

Fig. 4 is a section on the line 4—4, of Fig. 3.

I have indicated at 10 the main frame of the sextant or other observation instrument having the usual graduated measuring arc 11, pivoted index bar 12, fixed telescope or eye-piece 13, and handle 14. The free end of the index bar 12 is provided with the usual micrometer, vernier or the like 15 readable with reference to the graduations of the measuring arc 11. Rotatably mounted at the upper end of the index bar 12 is the usual index glass or mirror 16 and fixed to the instrument frame is the usual mirror or horizon glass 17. These parts are all conventional equipment.

My attachment for producing an artificial horizon is mounted on the instrument frame in any suitable manner and by any suitable means in advance of the horizon glass 17. It comprises two horizontally disposed bubble tubes 18 and 19, respectively, containing bubbles 18' and 19' movable therein with respect to the usual fixed graduation markings on the tubes. The bubble tubes are arranged so that their longitudinal axes angularly intersect each other, the axis of the bubble tube 18 being at right angles to the direct line of vision through the center of the horizon glass 17.

Preferably, but not necessarily, the angle of intersection is a right angle. When so arranged, the axis of the bubble tube 19 is offset to and parallel with such direct line of vision. Preferably, but not necessarily, both bubble tubes are arranged in substantially the same horizontal plane.

During use of the instrument, the bubble tube 18 indicates to the navigator deviations of the instrument laterally from the vertical and the bubble tube 19 indicates deviations of the instrument in a direction normal to the horizontal. Sights are taken only when both bubbles of both tubes are at rest correctly between the fixed graduation markings on their respective tubes. At such time the bubble 18' of the bubble tube 18 will exactly coincide with the direct line of vision through the center of the horizon glass the instrument will be on a plane with the sea horizon. This will be apparent from the diagram

S—I—H—E—S', of Fig. 1, wherein S—I—H—E is the pencil of light from the star, sun or other object as it suffers successive reflection by each of the mirrors 16 and 17, and is viewed through the telescope or eye-piece 13 along the horizontal line E—S' which is the direct line of vision through the center of the horizon glass.

The means for mounting my attachment on the frame of the instrument will vary with the type and make of the instrument, and any suitable means may be employed which will clamp the attachment firmly and reliably in position and at the same time preferably allow limited vertical adjustment of the bubble tube 18 with respect to the line E—S' through the center of the horizon glass.

If the invention is built into the instrument at the factory, this adjustment is essentially an adjustment by the maker of the instrument. If the invention is applied to an existing instrument as an attachment, this adjustment is made by the user preparatory to taking observations with the instrument.

Conveniently the bubble tubes may be positioned and retained in the relation specified by the positioning means detailed in Figs. 2, 3 and 4. Referring to these figures, I bolt or otherwise fasten as at 20 to the frame of the instrument a pair of clamp plates 21 and 22. The front clamp plate 21 is provided with a vertical slideway 21' within which is received a vertically adjustable slide plate 23 of corresponding cross section to the slideway, the adjustment of said slide plate being permitted and held by means of one or more cam levers, set screws or their equivalents 24. Extending from the base of the slide plate 23 is a cross member 25 carrying an upwardly extending member 26 to the free end of which are attached in any suitable manner the bubble tubes 18 and 19.

In order to permit the movement of the bubble 19' in the bubble tube 19 to be conveniently observed, I mount, preferably on the upper end of the member 26, a mirror 27 arranged at such an angle as to overlie the bubble tube and reflect the image of the bubble in a vertical position. Preferably the angle of this mirror is 45° where the bubble tube 19 is arranged at right angles to the bubble tube 18.

The bubbles may be faintly illuminated in any suitable manner, as by coating portions of their tubes with luminous paint, as indicated at 28 in Fig. 2.

In addition to its primary use as an artificial horizon under conditions where the natural horizon may be concealed, my attachment enables the time of day to be ascertained and, at noon, the latitude to be obtained.

What I therefore claim and desire to secure by Letters Patent is:—

1. A sextant or like instrument comprising a frame, an index glass and a horizon glass mounted thereon, and means for producing an artificial horizon comprising a first horizontally disposed bubble tube mounted on the instrument frame in advance of the horizon glass and at right angles to the direct line of vision through the center of said horizon glass, and a second horizontally disposed bubble tube mounted on the instrument frame in angularly intersecting relation to said first-named tube and in offset relation to such direct line of vision, said first-named tube indicating by movement of its bubble therein deviations of the instrument laterally from the vertical and indicating the true horizon, said second-named tube indicating by movement of its bubble therein deviations of the instrument in a direction normal to the horizontal, and a mirror mounted in angular relationship to said second mentioned bubble tube to reflect an image of the bubble in said tube, said mirror being positioned so that the bubble image reflected thereby is within the field of vision of the eye employed to take a sight through the instrument.

2. The instrument of claim 1, the bubble tubes being disposed at right angles to each other.

3. The instrument of claim 1, in which the mirror mounted adjacent the second bubble tube is at an angle to reflect the image of the bubble in said tube as a substantially vertically disposed bubble.

4. The instrument of claim 1, in which the mounting means for the bubble tubes holds said tubes in fixed relationship to each other and is vertically adjustable with respect to the frame.

5. The instrument of claim 1, and means for mounting said bubble tubes in the relation specified, said mounting means comprising a pair of clamping plates adapted to be fastened to the instrument frame, one of said plates having a vertical guideway, and a mounting frame including a first portion guided for vertical movement in said guideway, a second portion extending transversely thereto, and a third portion extending from second portion in spaced parallel relation to said first portion and carrying said tubes.

COURTNEY J. McDONALD.